(12) United States Patent
Yoon

(10) Patent No.: US 7,039,006 B2
(45) Date of Patent: May 2, 2006

(54) BOARD DUPLEXING APPARATUS FOR ASYNCHRONOUS TRANSFER MODE SWITCH AND METHOD OF CONTROLLING THE SAME

(75) Inventor: Ho-Jae Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 928 days.

(21) Appl. No.: 09/984,068

(22) Filed: Oct. 26, 2001

(65) Prior Publication Data

US 2002/0051454 A1 May 2, 2002

(30) Foreign Application Priority Data

Oct. 27, 2000 (KR) ................ 2000-63607

(51) Int. Cl.
*G01R 31/08* (2006.01)
*G06F 11/00* (2006.01)
*H04L 12/28* (2006.01)

(52) U.S. Cl. .............. 370/217; 370/216; 370/389; 370/392; 370/395.1

(58) Field of Classification Search ........... 370/230.1, 370/216, 242, 395.1, 39
See application file for complete search history.

(56) References Cited

U.S. PATENT DOCUMENTS 5,544,304 A * 8/1996 Carlson et al. .............. 714/10
5,742,413 A * 4/1998 Yun et al. ................... 398/30
5,898,689 A * 4/1999 Kumar et al. ............... 370/232
6,411,599 B1 * 6/2002 Blanc et al. ................. 370/219
6,570,845 B1 * 5/2003 Blanc et al. ................. 370/218
6,597,657 B1 * 7/2003 Tanaka ........................ 370/219
6,658,006 B1 * 12/2003 Chen et al. ............... 370/395.1
6,671,271 B1 * 12/2003 Takemura et al. .......... 370/352
6,751,195 B1 * 6/2004 Watanabe ................ 370/236.1

* cited by examiner

*Primary Examiner*—Chi Pham
*Assistant Examiner*—Christopher Grey
(74) *Attorney, Agent, or Firm*—Fleshner & Kim, LLP

(57) ABSTRACT

A board duplexing system for an asynchronous transfer mode (ATM) switch is provided which improves reliability and system efficiency. Duplexed boards of the ATM switch are monitored to determine if they are processing ATM cells independent of each other, or if a fault has occurred. If a fault has occurred in one of the duplexed boards, a connection to the faulty board is released and a new connection to the remaining board is established. A new version of connection information related to the faulty board is provided to the other board, thus providing an ATM cell service to all subscribers. Once the fault is removed, the system returns to a state in which the pair of boards may operate independently. Thus, if a fault occurs in one of the boards, this duplexing operation results in an increase in system reliability. If no faults are encountered, cells are processed by two independent ATM switch systems, resulting in an increase in system efficiency.

20 Claims, 4 Drawing Sheets

BOARD DUPLEXING APPARATUS FOR ASYNCHRONOUS TRANSFER MODE SWITCH AND METHOD OF CONTROLLING THE SAME

BACKGROUND OF THE INVENTION

1. Field of the Invention

The present invention relates in general to a board duplexing apparatus for an asynchronous transfer mode (ATM) switch and a method of controlling the same, and more particularly to a technique for individually duplexing all boards in an ATM switch, associated with a subscriber module, to increase a system efficiency.

2. Description of the Related Art

As well known to those skilled in the art, an ATM switch is a communication system that switches signals on a number of subscriber lines at high speed. The ATM switch, however, has a disadvantage in that it cannot process signals from a number of subscribers at the same time if a fault occurs in a circuit board or line for signal processing.

In order to solve the above problem with the ATM switch, there is a need for a duplexing technique to dually install circuit boards and lines in the ATM switch with duplicate boards and lines. Unfortunately, this duplexing may result in an increase in cost and a reduction in efficiency. In this regard, there is another need for a duplexing scheme capable of attaining the maximum efficiency at the minimum cost.

FIG. 1 is a functional block diagram of a conventional board duplexing apparatus for an ATM switch. As shown in this drawing, the conventional board duplexing apparatus comprises a subscriber module 10 for accommodating a plurality of subscribers to the ATM switch, and a synchronous digital hierarchy (SDH) interface card (SIC) 11 matching-connected to the subscriber module 10 through an optical line (interval A) for receiving an SDH frame from the subscriber module 10 at its ingress, extracting a plurality of cells from the received SDH frame and outputting the extracted cells at its egress. The SIC 11 is also adapted to receive a plurality of cells at its egress, convert the received cells into an SDH frame and transfer the converted SDH frame to the subscriber module 10 at its ingress.

The conventional board duplexing apparatus further comprises first and second ATM port management cards (APMCs) 12 and 13, each of which is matching connected to the SIC 11 through a Utopian data bus (interval B) to send and receive cells to/from the SIC 11. Each of the first and second APMCs 12 and 13 receives a plurality of cells from the SIC 11 at its ingress, detects or looks up headers of the received cells, appends routing tags respectively to the detected or looked-up headers, stacks the resulting cells in its internal buffer and then outputs the stacked cells at its egress according to scheduling. Each of the first and second APMCs 12 and 13 further receives a plurality of cells at its egress, performs a traffic shaping operation with respect to headers of the received cells such that the cells are appropriate to a data transfer rate of the Utopian data bus, and then transfers the resulting cells to the SIC 11 at its ingress.

The conventional board duplexing apparatus further comprises first and second switches 14 and 15, each of which is connected to the first and second APMCs 12 and 13 through serial links (interval C). Each of the first and second switches 14 and 15 receives a plurality of cells with routing tags from the first or second APMC 12 or 13 at its ingress and routes the received cells at its egress. Each of the first and second switches 14 and 15 also receives a plurality of cells at its egress and outputs the received cells to the first or second APMC 12 or 13 at its ingress.

A description will hereinafter be given of the operation of the conventional board duplexing apparatus with the above-mentioned construction with reference to FIG. 1.

In the normal initial state of the ATM switch as shown in FIG. 1, the first APMC 12 and first switch 14 are set to an active mode, whereas the second APMC 13 and second switch 15 are set to a standby mode.

The second APMC 13 of the standby mode is inhibited from making a connection to a Utopian data bus 2 under a bus switch control, while only the first APMC 12 of the active mode is connected to a Utopian data bus 1 under a bus switch control and in turn to the SIC 11 so as to send and receive cells to/from the SIC 11.

Further, the first APMC 12 sends cells to both the first switch 14 and second switch 15, but receives and switches cells from only the first switch 14 of the active mode.

In other words, cells from a connection, to be sent to a destination, are applied to and stored in both the first APMC 12 of the active mode and the second APMC 13 of the standby mode.

If a fault occurs in the first APMC 12, the first APMC 12 is disconnected from the Utopian data bus 1 by a bus switch operation under a buffer control so as to enter the standby mode, and the second APMC 13 is connected to the Utopian data bus or bus master 2 by a bus switch operation so as to enter the active mode. As a result, the second APMC 13 is connected to the SIC 11 to send and receive cells to/from the SIC 11.

Further, the second APMC 13 sends cells to both the first switch 14 and second switch 15, but receives and switches cells from only the first switch 14 of the active mode.

At this time, if a fault occurs in the first switch 14, the second switch 15 receives and switches cells from the second APMC 13.

The above-mentioned conventional board duplexing apparatus for the ATM switch is desirable to increase reliability of the system, but disadvantageous in that the same function blocks for duplexing are kept unused in the standby mode, resulting in a reduction in efficiency and an increase in opportunity cost.

SUMMARY OF THE INVENTION

Therefore, the present invention has been made in view of the above problems, and it is an object of the present invention to provide a board duplexing apparatus for an ATM switch and a method of controlling the same, wherein each function block of an ATM switch is duplexed in such a manner that the duplexed function blocks are operated independently of each other to process cells, and a duplexing operation is performed if a fault occurs in any one of the duplexed function blocks, thereby increasing a system efficiency of the ATM switch.

In accordance with one aspect of the present invention, the above and other objects can be accomplished by the provision of a board duplexing apparatus for an asynchronous transfer mode (ATM) switch, comprising a plurality of subscriber modules, each of the subscriber modules accommodating a plurality of subscribers to the ATM switch; a plurality of synchronous digital hierarchy (SDH) interface cards (SICs) matching-connected respectively to the subscriber modules, each of the SICs receiving an SDH frame from a corresponding one of the subscriber modules at its ingress, extracting a plurality of ATM cells from the received SDH frame, outputting the extracted cells at its egress, receiving a plurality of cells at its egress, converting the received cells into an SDH frame and transferring the converted SDH frame to the corresponding subscriber module at its ingress; a plurality of ATM port management cards (APMCs), each of the APMCs receiving the ATM cells from each of the SICs at its ingress, looking up headers of the received cells, appending routing tags respectively to the looked-up headers, outputting the resulting cells at its egress, receiving a plurality of cells at its egress, performing a traffic shaping operation with respect to headers of the received cells and transferring the resulting cells to an associated one of the SICs at its ingress; and a plurality of switches, each of the switches receiving the ATM cells with the routing tags from each of the APMCs at its ingress, routing the received cells at its egress, receiving a plurality of cells at its egress and outputting the received cells to an associated one of the APMCs at its ingress.

In accordance with another aspect of the present invention, there is provided a method of controlling a board duplexing operation of an asynchronous transfer mode (ATM) switch, comprising the steps of a) monitoring in real time whether duplexed boards in each pair of duplexed boards of the ATM switch process ATM cells independently of each other or are subject to occurrence of a fault; b) upon the fault occurrence in a specific one of the duplexed board pairs, releasing a connection to a faulty one of the duplexed boards in the specific duplexed board pair and setting up a connection to the other duplexed board in the specific duplexed board pair; and c) setting up a new version of connection information of the faulty duplexed board in the other duplexed board, providing an ATM cell service to all subscribers and returning to a normal state if the fault is removed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
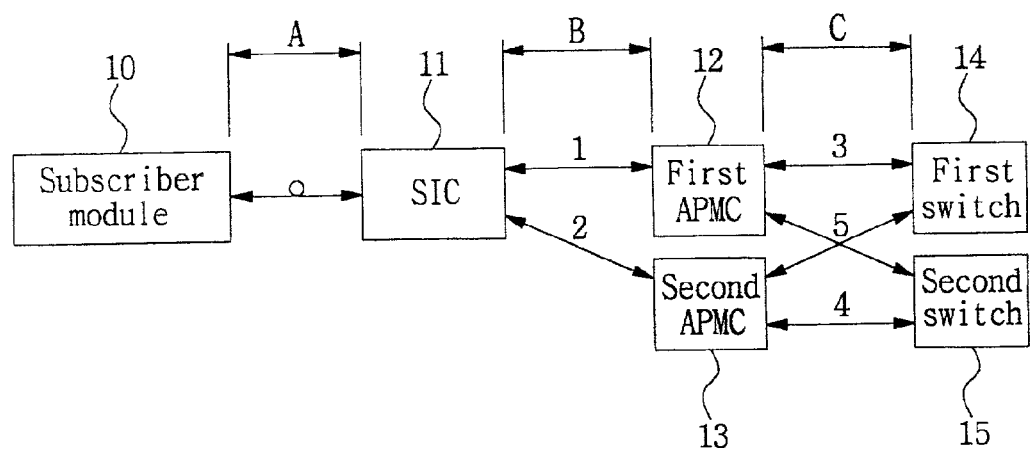
FIG. 1 is a functional block diagram of a conventional board duplexing apparatus for an ATM switch.
Figure 2:
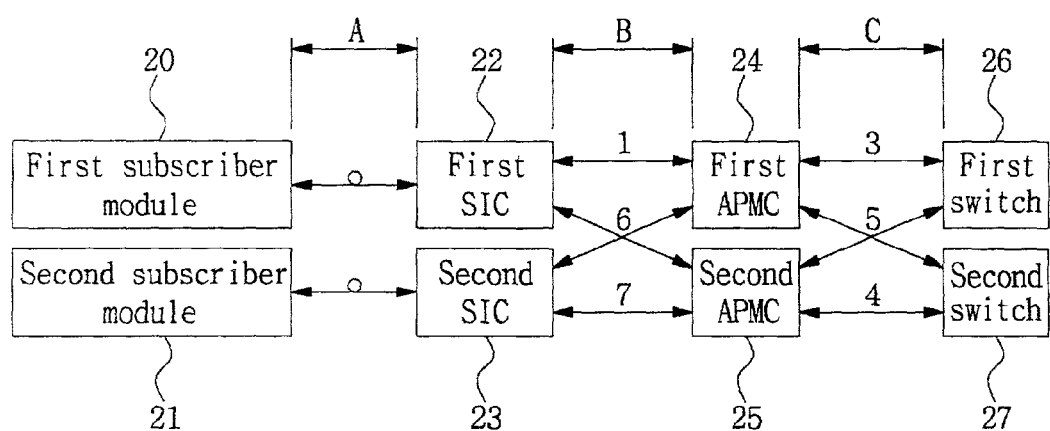
FIG. 2 is a functional block diagram of a board duplexing apparatus for an ATM switch in accordance with the present invention.

FIG. 2 is a functional block diagram of a board duplexing apparatus for an ATM switch in accordance with the present invention.

With reference to FIG. 2, the present board duplexing apparatus comprises first and second subscriber modules 20 and 21, each of which receives ATM cells from a plurality of subscribers. The first and second subscriber modules 20 and 21 are connected to first and second SICs 22 and 23 via optical lines A, respectively, to send and receive corresponding ATM cells from/to the first and second SICs 22 and 23.

Alternatively, a synchronous transfer mode level N or digital signal level 3 (DS-3: communication access level equivalent to 28T1 channel and running at 44.736 Mbps) may be used between each of the first and second SICs 22 and 23 and each of the first and second subscriber modules 20 and 21 instead of the SDH interface.

STM-N is a transfer mode of SDH-based optical fiber digital communication. The basic STM-N is called STM-1 with a transfer rate of 155.5 Mbps.

The transfer rate of STM is defined as basic rate by N, namely, STM-3=466.56 Mbps, STM-4=622.08 Mbps, STM-6=933.12 Mbps, STM-8=1224.16 Mbps, STM-12=1866.24 Mbps, STM-16=2.48 Gbps, and STM-64=9.95 Gbps.

The first SIC 22 extracts a plurality of ATM cells from an SDH frame from the first subscriber module 20 and sends the extracted ATM cells to first and second APMCs 24 and 25 respectively via Utopian data buses 1 and 6.

The second SIC 23 extracts a plurality of ATM cells from an SDH frame from the second subscriber module 21 and sends the extracted ATM cells to first and second APMCs 24 and 25 respectively via Utopian data bus 6 and a Utopian data bus 7.

In other words, the first SIC 22 receives an SDH frame from the first subscriber module 20 at its ingress over the associated optical line A, extracts a plurality of ATM cells from the received SDH frame and outputs the extracted ATM cells to both the first and second APMCs 24 and 25 at its egress over the associated Utopian data buses 1 and 6.

At this time, the first SIC 22 is connected respectively to the first APMC 24 in an active mode and the second APMC 25 in a standby mode.

Accordingly, cells sent and received between the first SIC 22 and the first APMC 24 over the Utopian data bus 1 are validly processed, while cells sent and received between the first SIC 22 and the second APMC 25 over the Utopian data bus 6 are stored in an internal memory of the second APMC 25, and not processed.

Similarly, the second SIC 23 is connected simultaneously to the first and second APMCs 24 and 25 via the associated Utopian data buses 6 and 7 to send and receive cells to/from the first and second APMCs 24 and 25. At this time, the second SIC 23 is connected to the second APMC 25 in the active mode, thereby making it valid to process cells sent and received over the Utopian data bus 7. Alternatively, the second SIC 23 is connected to the first APMC 24 in the standby mode, thereby causing the first APMC 24 to store cells from the second SIC 23 in its internal memory, and not process the cells.

The first APMC 24 looks up headers of ATM cells received in the active mode, appends routing tags respectively to the looked-up headers, stores the resulting cells in its internal buffer and then outputs the stored cells to both first and second switches 26 and 27 according to scheduling.

The first APMC 24 is connected to the first and second switches 26 and 27 via serial links 3 and 5, respectively. At this time, the first APMC 24 is connected to the first switch 26 in the active mode.

As a result, the first switch 26 switches ATM cells from the first APMC 24 connected thereto in the active mode, whereas the second switch 27 stores the ATM cells from the first APMC 24, and not switches them.

Similarly, the second APMC 25 provides its ATM cells to both the first and second switches 26 and 27 respectively via the serial link 5 and a serial link 4. At this time, the second APMC 25 is connected to the second switch 27 in the active mode, thereby allowing the second switch 27 to switch the ATM cells from the second APMC 25.

Figure 4:
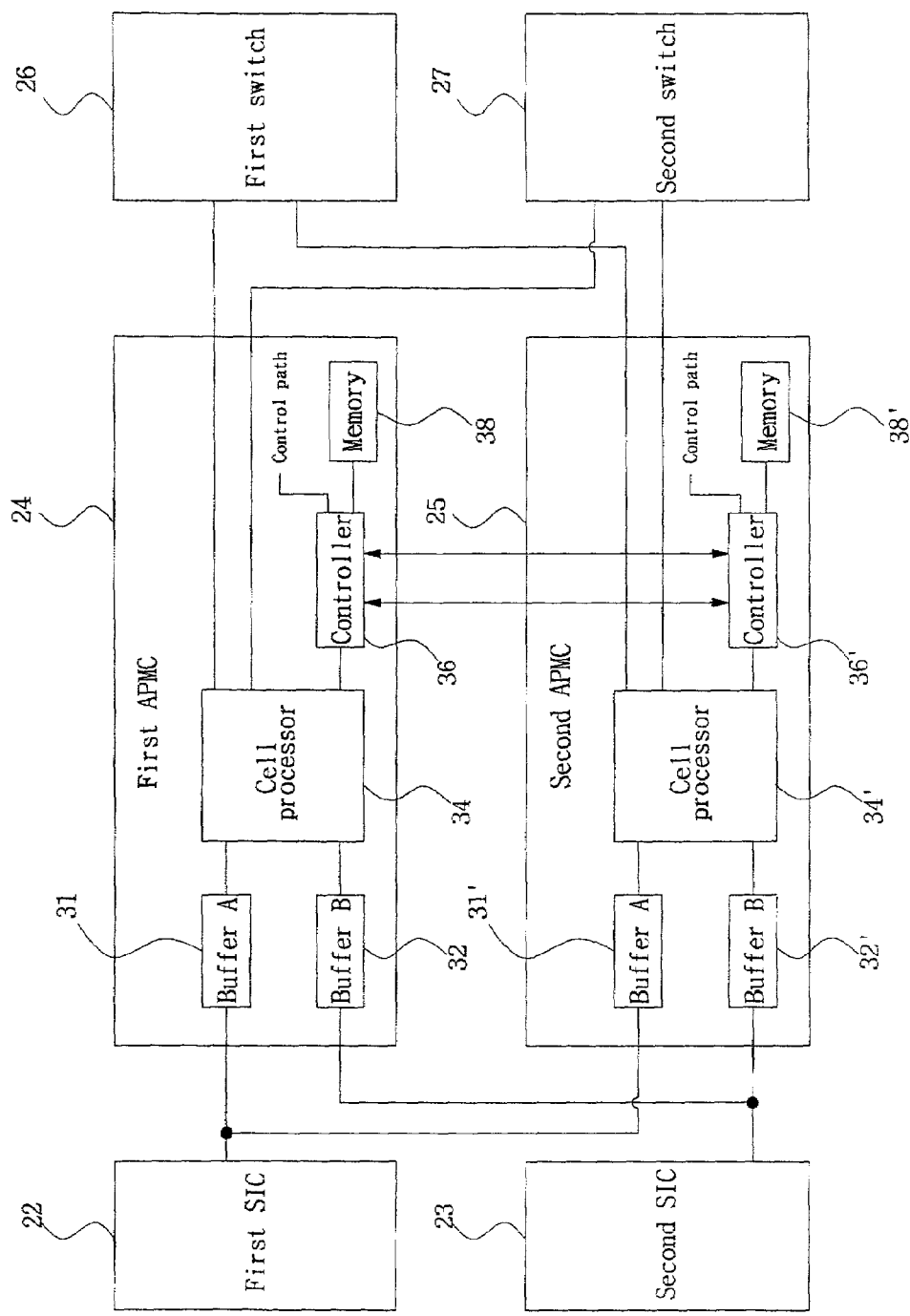
FIG. 4 is a detailed functional block diagram of an APMC in accordance with the present invention.

A more detailed description will hereinafter be given of the construction of each of the first and second APMCs 24 and 25 as stated above, with reference to FIG. 4.

The first APMC 24 includes a buffer A 31 connected to the first SIC 22 for temporarily storing ATM cells from the first SIC 22, and a buffer B 32 connected to the second SIC 23 for temporarily storing ATM cells from the second SIC 23.

A controller 36 is provided in the first APMC 24 to monitor and control respective function blocks of the first APMC 24. The buffer A 31 and buffer B 32 are set to either of the active mode and standby mode under the control of the controller 36. In the present embodiment, the buffer A 31 is initially set to the active mode and the buffer B 32 is initially set to the standby mode.

A cell processor 34 is provided in the first APMC 24 to process ATM cells from the first SIC 22, stored in the buffer A 31 of the active mode, under the control of the controller 36. The cell processor 34 looks up headers of the ATM cells from the first SIC 22, appends routing tags respectively to the looked-up headers and temporarily stores the resulting cells in its internal buffer, as well as storing them in a memory 38.

The controller 36 outputs the ATM cells stored in the buffer of the cell processor 34 to both the first and second switches 26 and 27 according to scheduling, respectively, via serial links. At this time, the first APMC 24 is connected to the first switch 26 in the active mode and the second switch 27 in the standby mode, respectively.

The first APMC 24 and the second APMC 25 are substantially the same in construction, and process reverse cells to the above cells in the same manner as the above.

Next, a detailed description will be given of the operation of the board duplexing apparatus for the ATM switch with the above-stated construction in accordance with the preferred embodiment of the present invention with reference to FIG. 3.

Figure 3:
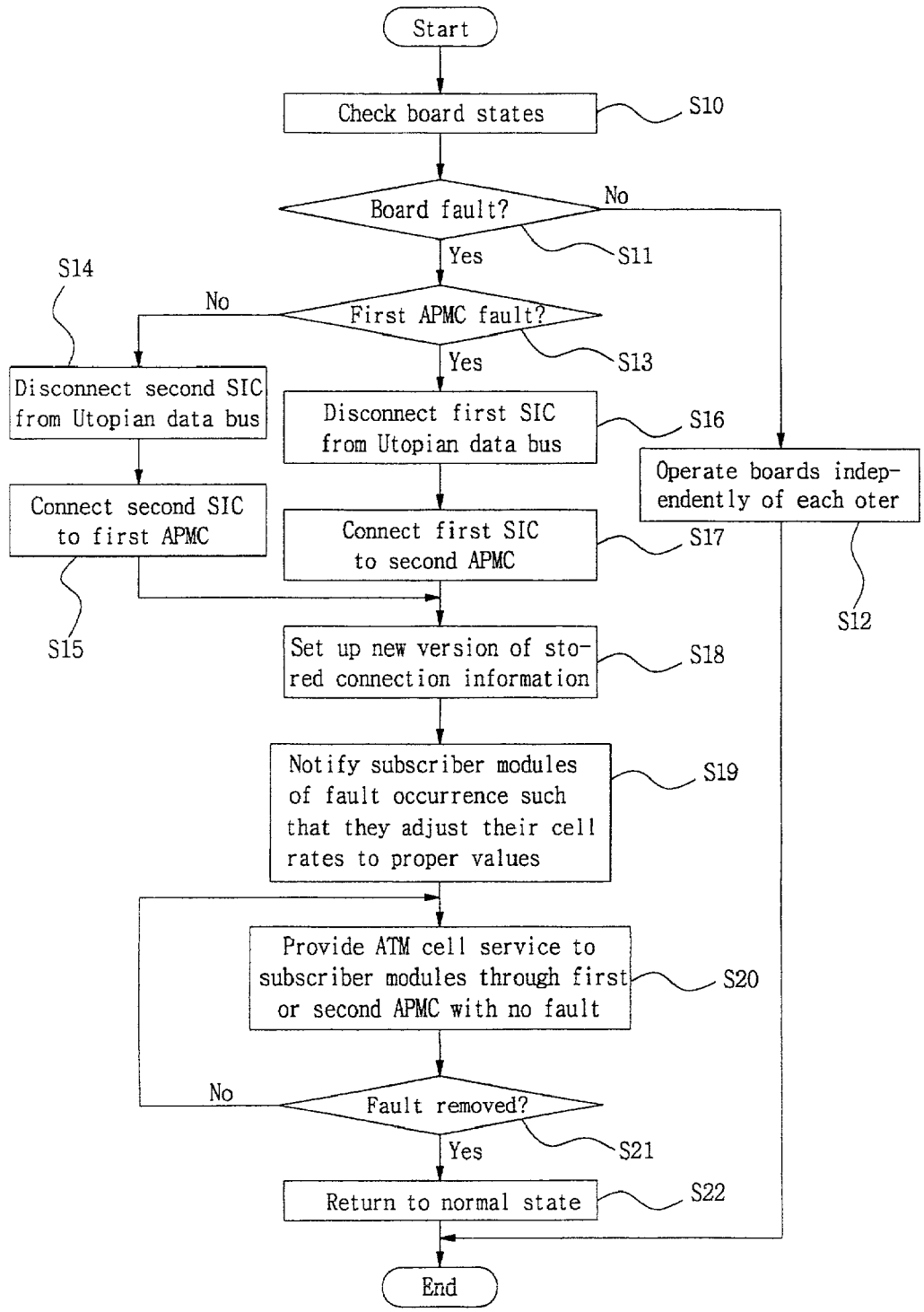
FIG. 3 is a flowchart illustrating a method of controlling a board duplexing operation of an ATM switch in accordance with the present invention.

FIG. 3 is a flowchart illustrating a method of controlling a board duplexing operation of the ATM switch in accordance with the present invention.

Under the condition that the ATM switch with the above-described duplex board is normally operated, in the connection interval B, the Utopian data bus 1 between the first SIC 22 and the first APMC 24 is in the active mode and the Utopian data bus 6 between the first SIC 22 and the second APMC 25 is in the standby mode. As a result, ATM cells from the first SIC 22 are not subjected to a process by the cell processor 34' due to the operation of the buffer 31', which functions as a bus switch.

At this time, in a similar manner to the first SIC 22, in the second SIC 23, the Utopian data bus 7 is in the active mode and the Utopian data bus 6 is in the standby mode.

The first APMC 24 selects the serial link 3 in the interval C as an active path to the first switch 26.

Similarly, the second APMC 25 selects the serial link 4 as an active path to the second switch 27. Therefore, two individual systems are operated independently of each other.

That is, the first subscriber module 20, first SIC 22, first APMC 24 and first switch 26 are operated as one individual ATM switch system, and the second subscriber module 21, second SIC 23, second APMC 25 and second switch 27 are operated as the other individual ATM switch system.

On the other hand, in the first and second APMCs 24 and 25, each of the controllers 36 and 36' integratedly manages even traffic information or connection information from the other controller via a duplex data channel and has a minimum cell rate (MCR) that does not exceed a maximum port capacity of the other controller. Because the controllers 36 and 36' exchange their connection information with each other, they store each other's connection information in the corresponding memories 38 and 38'.

Under the above operating condition, the states of respective function boards are checked (S10) to determine whether there is a faulty one among the function boards (S11). If it is determined at step S11 that there is no faulty one among the function boards, two individual ATM switch systems are allowed to be operated independently of each other (S12).

In the case where it is determined at the above step S11 that there is a faulty one among the function boards, a determination is made as to whether a fault has occurred in the first APMC 24 (S13). Where a fault has occurred in the first APMC 24, the controller 36 in the first APMC 24 reports the controller 36' in the second APMC 25 via the duplex data channel that the fault has occurred in the first APMC 24, and controls the buffer A 31 to release its connection to the Utopian data bus 1. As a result, the first APMC 24 is disconnected from the Utopian data bus 1 so as to enter the standby mode (S16).

The controller 36' in the second APMC 25 changes the buffer A 31' from the disconnection mode or standby mode to the active mode, thereby causing the first SIC 22 and the second APMC 25 to be interconnected. As a result, the output cells from the first SIC 22 are applied to the second APMC 25 over the Utopian data bus 6 of the active mode (S17).

The second APMC 25 sets up a new version of the connection information of the first APMC 24 stored therein (S18), and then notifies the first and second subscriber modules 20 and 21 of the fault occurrence and that the ATM cell service will be provided at the minimum cell rate (MCR) until the fault is removed (S19).

In response to such a notification, the first and second subscriber modules 20 and 21 sense the fault occurrence and thus adjust their cell rates to lower values.

The first and second switches 26 and 27 are also connected to the second APMC 25 in the active mode to send and receive cells to/from the second APMC 25. If a fault also occurs in the second switch 27 under the condition that the first APMC 24 has failed, the second APMC 25 changes the serial link to the first switch 26 from the standby mode to the active mode so as to send and receive cells to/from the first switch 26.

While cells from the first and second subscriber modules 20 and 21 are processed by means of the second APMC 25 as described above, a determination is made as to whether the current fault has been removed (S21). If it is determined at step S21 that the current fault has been removed, the control method returns to the original normal state (S22), so the individual ATM switch services are performed independently of each other.

As apparent from the above description, the present invention provides a board duplexing apparatus for an ATM switch and a method of controlling the same, wherein, if a fault occurs in any board, a duplexing operation is performed, resulting in an increase in system reliability, and, if no fault occurs in any board, cells are processed by two independent ATM switch systems, resulting in an increase in system efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A board duplexing apparatus for an asynchronous transfer mode (ATM) switch, comprising:
   a plurality of subscriber modules, each of said plurality of subscriber modules processing ATM cells from a plurality of subscribers;

a corresponding plurality of synchronous digital hierarchy (SDH) interface cards (SICs) respectively connected to said plurality of subscriber modules, each of said plurality of SICs receiving an SDH frame from a corresponding one of said plurality of subscriber modules at its ingress, extracting a plurality of ATM cells from the received SDH frame, and outputting the extracted cells at its egress;

a corresponding plurality of ATM port management cards (APMCs), each of said plurality of APMCs looking up headers of active ones of the ATM cells from said plurality of SICs, appending corresponding routing tags to the headers, and outputting the resulting cells; and a corresponding plurality of switches, each of said plurality of switches switching active ones of the ATM cells from said plurality of APMCs, wherein respective subscriber modules, SICs, APMCs, and switches are connected so as to form a corresponding plurality of parallel paths for processing ATM cells simultaneously therethrough, and wherein ATM cells are re-routed from a primary path to an alternate path of the plurality of paths when a fault is detected in the primary path.

2. The board duplexing apparatus as set forth in claim 1, wherein said plurality of SICs comprises a first and a second SIC, and said plurality of APMCs comprises a first and a second APMC, and wherein only one of said first and second APMCs processes active ATM cells from said first and second SICs when a fault occurs in the other APMC.

3. The board duplexing apparatus as set forth in claim 1, wherein each of said plurality of subscriber modules and each of said plurality of SICs are connected via an optical line, each of said plurality of SICs and each of said plurality of APMCs are connected via a Utopian line, and each of said plurality APMCs and each of said plurality of switches are connected via a serial link.

4. The board duplexing apparatus as set forth in claim 1, wherein each of said plurality of APMCs includes:

buffering means connected in common to said plurality of SICs for storing the ATM cells from said plurality of SICs and selectively performing the output of the stored cells in response to a control signal;

a cell processor for looking up headers of ATM cells output from said buffering means, appending corresponding routing tags to the headers, and outputting the resulting cells according to scheduling;

a controller for monitoring and controlling respective function blocks of a corresponding one of said plurality of APMCs, said controller generating said control signal to said buffering means; and a memory for storing and outputting the ATM cells from said cell processor under the control of said controller.

5. The board duplexing apparatus as set forth in claim 4, wherein said plurality of SICs comprises a first and a second SIC, and wherein said buffering means includes:

a first buffer for storing the ATM cells from said first SIC; and a second buffer for storing the ATM cells from said second SIC.

6. The board duplexing apparatus as set forth in claim 5, wherein said first buffer outputs the ATM cells from said first SIC to said cell processor when said first SIC is in an active mode, and said second buffer outputs the ATM cells from said second SIC to said cell processor when said second SIC is in the active mode.

7. The board duplexing apparatus as set forth in claim 6, wherein said controller determines which one of said SICs is in said active mode and generates said control signal in accordance with the determination.

8. The board duplexing apparatus as set forth in claim 4, wherein said cell processor performs a traffic shaping operation with respect to headers of cells received at an egress of a corresponding one of said plurality of APMCs.

9. A board duplexing apparatus for an asynchronous transfer mode (ATM) switch, comprising:

a plurality of subscriber modules, each of said subscriber modules accommodating a plurality of subscribers to the ATM switch;

a plurality of synchronous digital hierarchy (SDH) interface cards (SICs) connected respectively to said subscriber modules, each of said SICs receiving an SDH frame from a corresponding one of said subscriber modules at its ingress, extracting a plurality of ATM cells from the received SDH frame, and outputting the extracted cells at its egress, or receiving a plurality of cells at its egress, converting the received cells into an SDH frame and transferring the converted SDH frame to the corresponding subscriber module at its ingress;

a plurality of ATM port management cards (APMCs), each of said APMCs receiving the ATM cells from each of said SICs at its ingress, looking up headers of the received cells, appending appropriate routing tags to the headers, and outputting the resulting cells at its egress, receiving a plurality of cells at its egress, performing a traffic shaping operation based on headers of the received cells, and transferring the resulting cells to an associated one of said SICs at its ingress; and a plurality of switches, each of said switches receiving the ATM cells with the routing tags from each of said APMCs at its ingress, and routing the received cells at its egress, or receiving a plurality of cells at its egress, and outputting the received cells to an associated one of said AFMCs at its ingress, wherein the plurality of subscriber modules, SICs, APMCs, and switches form a plurality of parallel paths for simultaneously processing ATM cells therethrough, and for transferring ATM cells therebetween for processing when a fault is encountered in one of the APMCs or one of the switches.

10. The board duplexing apparatus as set forth in claim 9, wherein, when a fault occurs in any one of said APMCs, any one of the other APMCs processes the ATM cells associated with the faulty APMC.

11. The board duplexing apparatus as set forth in claim 9, wherein each of said subscriber modules and each of said SICs are connected via an optical line, each of said SICs and each of said APMCs are connected via a Utopian line, and each of said APMCs and each of said switches are connected via a serial link.

12. The board duplexing apparatus as set forth in claim 9, wherein each of said APMCs includes:

buffering means connected to said SICs for storing the ATM cells from said SICs and selectively outputting the stored cells in response to a control signal;

a cell processor for looking up headers of ATM cells output from said buffering means, appending appropriate routing tags to the headers and outputting the resulting cells according to scheduling;

a controller for monitoring and controlling respective function blocks of a corresponding one of said APMCs, said controller determining whether a current mode of said buffering means is an active mode or a standby mode and then generating said control signal to said buffering means in accordance with the determination; and a memory for storing and outputting the ATM cells from said cell processor under the control of said controller.

13. The board duplexing apparatus as set forth in claim 12, wherein said buffering means includes:
    a first buffer for storing the ATM cells from a first one of said SICs and outputting the stored ATM cells to said cell processor only when said first SIC is in the active mode; and
    a second buffer for storing the ATM cells from a second one of said SICs and outputting the stored ATM cells to said cell processor only when said second SIC is in the active mode.

14. The board duplexing apparatus as set forth in claim 12, wherein said cell processor performs the traffic shaping operation based on the headers of the cells received at the egress of a corresponding one of said APMCs.

15. A method of controlling a board duplexing operation of an asynchronous transfer mode (ATM) switch, comprising:
    processing ATM cells simultaneously through separate duplexed boards of at least one pair of duplexed boards;
    monitoring in real time whether either of the duplexed boards in each pair of duplexed boards is subject to occurrence of a fault;
    releasing a connection to a faulty one of the duplexed boards of the at least one pair of duplexed boards and setting up a connection to the other duplexed board upon occurrence of a fault; and
    setting up a new version of connection information related to said faulty duplexed board in said other duplexed board, providing an ATM cell service to all subscribers through said other duplexed boards, and returning to a normal state in which cells are processed simultaneously through both boards of the at least one pair of duplexed boards if the fault is removed.

16. The method as set forth in claim 15, wherein said monitoring step includes:
    checking a state of each of the duplexed boards in each of said at least one pair of duplexed boards;
    determining whether the fault has occurred in any one of said duplexed boards in each of said at least one pair of duplexed boards; and
    operating said duplexed boards in each of said at least one pair of duplexed boards independently of each other if it is determined that no fault has occurred in any of said duplexed boards in each of said at least one pair of duplexed boards.

17. The method as set forth in claim 16, wherein said releasing step includes:
    determining whether the fault has occurred in a first ATM port management card (APMC) if it is determined that a fault has occurred in any one of said duplexed boards in each of said at least one pair of duplexed boards;
    disconnecting a Utopian data bus between a second APMC and a second one of two synchronous digital hierarchy (SDH) interface cards (SICs) if it is determined that no fault has occurred in said first APMC; and
    connecting a Utopian data bus between said second SIC and said first APMC.

18. The method as set forth in claim 17, further including:
    disconnecting a Utopian data bus between said first APMC and a first one of the two SICs if it is determined that a fault has occurred in said first APMC; and
    connecting a Utopian data bus between said first SIC and said second APMC.

19. The method as set forth in claim 15, wherein said setting up step includes:
    setting up the new version of the connection information of said faulty duplexed board in said other duplexed board;
    notifying a plurality of subscriber modules of the fault occurrence so as to adjust cell rates of the plurality of subscriber modules to proper values; and
    providing ATM cell service to said plurality of subscriber modules through said other duplexed board.

20. The method as set forth in claim 19, further including:
    determining whether the fault has been removed; and
    continuing to provide ATM cell service to said plurality of subscriber modules if it is determined that the fault has not been removed, and normally operating said duplexed boards independently of each other if it is determined that the fault has been removed.

* * * * *